(12) United States Patent
Kitazoe et al.

(10) Patent No.: US 8,879,500 B2
(45) Date of Patent: Nov. 4, 2014

(54) HANDOVER PROCEDURES IN A WIRELESS COMMUNICATIONS SYSTEM

(75) Inventors: Masato Kitazoe, Hachioji (JP); Saiyiu D. Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1317 days.

(21) Appl. No.: 11/740,879

(22) Filed: Apr. 26, 2007

(65) Prior Publication Data

US 2008/0089292 A1 Apr. 17, 2008

Related U.S. Application Data

(60) Provisional application No. 60/795,841, filed on Apr. 27, 2006, provisional application No. 60/784,606, filed on Mar. 21, 2006.

(51) Int. Cl.
*H04W 4/00* (2009.01)
*H04L 1/18* (2006.01)
*H04L 12/801* (2013.01)
*H04W 36/00* (2009.01)
*H04W 36/02* (2009.01)
*H04L 1/00* (2006.01)
*H04W 8/08* (2009.01)
*H04W 28/04* (2009.01)
*H04W 36/12* (2009.01)
*H04W 80/02* (2009.01)
*H04W 92/04* (2009.01)

(52) U.S. Cl.
CPC .............. *H04L 1/1829* (2013.01); *H04L 47/14* (2013.01); *H04W 36/0055* (2013.01); *H04W 36/02* (2013.01); *H04L 2001/0092* (2013.01); *H04W 8/08* (2013.01); *H04W 28/04* (2013.01); *H04W 36/00* (2013.01); *H04W 36/12* (2013.01); *H04W 80/02* (2013.01); *H04W 92/045* (2013.01)
USPC ........... 370/331; 455/436; 455/437; 455/438; 455/439; 455/443

(58) Field of Classification Search
USPC ........... 455/436, 437, 438, 439, 443; 370/331
See application file for complete search history.

(56) References Cited

U.S. PATENT DOCUMENTS 5,530,693 A 6/1996 Averbuch et al.
5,570,367 A * 10/1996 Ayanoglu et al. ............. 370/346
(Continued)

FOREIGN PATENT DOCUMENTS

EP 0695053 1/1996
EP 1337125 8/2003
(Continued)

OTHER PUBLICATIONS

3GPP TSG-RAN WG2 Meeting #48-Document #R2-051696-QUALCOMM: "Enhanced HSDPA Re-pointing Scheme" 3rd generation partnership project, Technical sepcification group, Radio access network, Working Group 2, Aug. 26, 2005, pp. 1-8, XP002416750.
(Continued)

*Primary Examiner* — Khalid Shaheed
(74) *Attorney, Agent, or Firm* — Dalei Dong

(57) ABSTRACT

A wireless communications system having a radio access network (RAN). A wireless terminal is connected to a serving node in the RAN. The wireless terminal exchange messages with a serving node to support a handover to a target node in the RAN. The target node receives the hand over and provides to the wireless terminal the identity of one or more messages sent from the serving node to the target node that were not acknowledged by the wireless terminal. The wireless terminal provides information to the target node to prevent the retransmission of one or more stale messages following handover.

40 Claims, 11 Drawing Sheets

(56) References Cited

U.S. PATENT DOCUMENTS

| | | | |
|---|---|---|---|
| 6,717,927 B2 | 4/2004 | Chao et al. | |
| 7,046,648 B2* | 5/2006 | Zhang et al. | 370/331 |
| 7,212,821 B2 | 5/2007 | Laroia et al. | |
| 7,266,105 B2 | 9/2007 | Wu | |
| 2003/0142648 A1 | 7/2003 | Semper | |
| 2004/0203623 A1 | 10/2004 | Wu | |
| 2004/0219917 A1* | 11/2004 | Love et al. | 455/436 |
| 2006/0058047 A1 | 3/2006 | Jeong et al. | |
| 2006/0077923 A1* | 4/2006 | Niwano | 370/328 |
| 2006/0209869 A1* | 9/2006 | Kim et al. | 370/431 |
| 2008/0039092 A1 | 2/2008 | Kitazoe | |
| 2008/0089228 A1* | 4/2008 | Lin et al. | 370/230 |
| 2008/0254800 A1 | 10/2008 | Chun et al. | |
| 2009/0196239 A1* | 8/2009 | Lee et al. | 370/329 |

FOREIGN PATENT DOCUMENTS

| | | |
|---|---|---|
| JP | 8065355 A | 3/1996 |
| WO | WO03087978 A2 | 10/2003 |

OTHER PUBLICATIONS

Verdone, R. et al.: "Analytical Evaluation of Blocking Probability in a Mobile Radio System with Directed Retry," IEEE Journal on Selected Areas in Communications, IEEE Service Center, Piscataway, US, vol. 19, No. 2, pp. 331-332, Feb. 2001, XP011055326.

3GPP TSG-RAN WG2 #46bis Meeting-Document #R2-051087—China Mobile Communications Corporation: "HSDPA/HSUPA Performance Enhancement to Support IMS Realtime Services," (Apr. 4, 2005), pp. 1-6, XP00236869, Apr. 4, 2005.

Chun-Ting Chou et al: "An enhanced inter-access point protocol for uniform intra and intersubnet handoffs" IEEE Transactions on mobile computing, IEEE New York, NY, US, vol. 4, No. 4, Jul. 2005, pp. 321-334, XP011133503.

Favallil et al: "Performance comparison of different TCP schemes over UTA-TDD channels" Vehicular technology conference, 2005. VTC-2005-Fail. 2005, Piscataway, NJ, USA, IEEE, Sep. 25, 2005, pp. 2680-2683, XP010879049.

3rd Generation Partnership Project: Technical Specification Group Radio Access Network; Interlayer Procedures in Connected Mode (Release 1999); 3GPP TS 25.303 V.3.9.0 (Sep. 2001) ETSI TS 125 303, XP014008610.

International Search Report—PCT/US07/067689, International Search Authority—European Patent Office—Oct. 19, 2007.

Taiwan Search Report—TW096109773—TIPO—Mar. 21, 2011.

Written Opinion—PCT/US2007/067689, International Search Authority, European Patent Office, Oct. 19, 2007.

* cited by examiner

HANDOVER PROCEDURES IN A WIRELESS COMMUNICATIONS SYSTEM

PRIORITY

This application claims the benefit of U.S. Provisional Application Ser. No. 60/795,841 filed Apr. 27, 2006, entitled "Enode B Change Procedure In A Wireless Communication System," and U.S. Provisional Application Ser. No. 60/784,606, filed Mar. 21, 2006, entitled "Enode B Change Procedure In A Wireless communication System" and Utility Application Ser. No. 11/687,581, filed Mar. 16, 2007, entitled "Handover Procedures in a Wireless Communications System." The entirety of the above-referenced application is incorporated herein by reference.

FIELD

The present disclosure relates generally to telecommunications, and more particularly, to various concepts and techniques for handover in a wireless communications system.

BACKGROUND

Wireless communication networks are widely deployed to provide various communication services such as telephone, video, data, messaging, broadcasts, and so on. The networks may be multiple access networks capable of supporting communications for multiple users by sharing the available network resources. An example of such a network is a Universal Terrestrial Radio Access network (UTRAN). UTRAN is the Radio Access network (RAN) that is part of the Universal Mobile Telecommunications System (UTMS), a third generation (3G) mobile phone technology promulgated by the "3rd Generation Partnership Project" (3GPP), UMTS, which is the successor to Global System for Mobile Communications (GSM), currently uses Wideband Code division Multiple Access (W-CDMA) as the underlying air interface in the UTRAN architecture with the existing GSM infrastructures for the core network.

In the UTRAN architecture, the RAN is divided into a number of Radio Network Subsystems (RNS), each controlled by a Radio Network Controller (RNC). The RNC is a node responsible for, among other things, assigning, reconfiguring and releasing radio resources within the RNS. The RNCs may be interconnected through an interface comprising a direct physical connections or virtual networks using any suitable transport network.

The geographic region covered by a RNS is divided into a number of cells, with a base station serving each cell. A base station, which is referred to as a Node-B, is a node having a radio transceiver to support an air interface with all wireless terminals in its cellular region. A wireless terminal, which is referred to as "user equipment" (UE), uses a Radio Resource Control (RRC) protocol to obtain radio resources. RRC is a link layer protocol within is terminated at the RNC. Below the RRC layer in the protocol stack is another link layer protocol known as Radio Link control (RLC). The RLC layer, which is terminated at the Node-B, provides for the retransmission of data and controls to achieve a lower error rate than the physical layer could achieve alone.

As the UE roams from one cell to another in an RAN, various handover procedures are implemented to ensure that the UE maintains its connections with the core network. A handover is a process in which the RAN changes the radio transceivers to provide bearer services maintaining a defined service level. Handover may be initiated by the UE or the RAN based on transmission criteria (e.g., signal strength, signal quality, power level, propagation delay, etc.) as well as traffic criteria (e.g., load balancing, backhaul constraints, maintenance, etc.).

A RNS handover procedure involves tearing down the RLC connection with a serving Node-B and reestablishing it with a target Node-B. The procedure also requires transferring the RRC context (i.e., RRC connection) between the serving and target RAN. A problem arises when RRC messages are lost in transet as the RLC connection is being torn down and reestablished. This tends to result in dropped calls. Because the handover of the wireless terminal between RNSs is far less frequent than the handover between cells within a RNS, the level of dropped calls have not gained much attention.

Evolved UTRAN (E-UTRAN) is 3GPP's proposal of an evolution of the 3G W-CDMA system. An E-UTRAN architecture includes Evolved Node-Bs (eNode-B) dispersed through the RNS to support an air interface with wireless terminals. The RNCs have been replaced with Evolved Packet Cores (EPC) and moved from the RAN to the core network. As a result, the RRC layer has been pushed down into the eNode-B. With the RRC terminated at the eNode-B, the frequency of dropped calls from lost RRC messages will likely increase. Accordingly, there is a need in the art for a more robust handover procedure in E-UTRAN architectures. The solution should be generic enough to be extended to other network architectures.

SUMMARY

In accordance with one aspect of the disclosure, a wireless terminal includes a processor configured to exchange messages with a serving node to support a handover to a target node in a radio access network, wherein the processor is further configured to provided information to the target node to prevent the retransmission of one or more stale messages following handover.

In accordance with another aspect of the disclosure, a node includes a processor configured to receive a handover of a wireless terminal from a serving node, the wireless terminal having an acknowledgement based protocol, and wherein the processor is further configured provide information to the wireless terminal identifying one or more messages sent from the serving node to the wireless terminal that were not acknowledged.

In accordance with a further aspect of the disclosure, a wireless terminal includes means for exchanging messages with a serving node to support a handover to a target node in a radio access network, and means for providing information to the target node to prevent the retransmission of one or more stale message following handover.

In accordance with yet a further aspect of the disclosure, a node includes means for receiving a handover of a wireless terminal from a serving node, the wireless terminal having an acknowledgement based protocol, and means for providing information to the wireless terminal identifying one or more messages sent from the serving node to the wireless terminal that were not acknowledged.

In accordance with still yet another aspect of the disclosure, a method of hand over in radio access network includes exchanging message between a wireless terminal and a serving node to support a handover to a target node, and providing information from the wireless terminal to the target node to prevent the retransmission of one or more stale messages following handover.

In accordance with yet a further aspect of the disclosure, a method of hand over in radio access network includes handing over a wireless terminal from a serving node to a target node, the wireless terminal having an acknowledgement based protocol, and providing information from the target node to the wireless terminal identifying one or more messages sent from the serving node to the wireless terminal that were not acknowledged.

In accordance with yet another aspect of the disclosure, a computer-readable medium for use in a wireless terminal includes instructions stored thereon. The include code to exchange messages with a serving node to support a handover to a target node in a radio access network, and code to provide information to the target node to prevent the retransmission of one or more stale messages following handover.

In accordance with yet a further aspect of the disclosure, a computer-readable medium for use in a node includes instructions stored thereon. The instructions include code to support a handover of a wireless terminal from a serving node, the wireless terminal having an acknowledgement based protocol, and code to provide information to the wireless terminal identifying one or more messages sent from the serving node to the wireless terminal that were not acknowledged.

It is understood that other aspects of the invention will become readily apparent to those skilled in the art from the following detailed description, wherein it is shown and described only various aspects of the invention by way of illustration. As will be realized, the invention is capable of other and different configurations and its several details are capable of modification in various other respects, all without departing from the scope of the invention. Accordingly, the drawings and detailed description are to be regarded as illustrative in nature and not as restrictive.

DETAILED DESCRIPTION

The detailed description set forth below in connection with the appended drawings is intended as a description of various aspects of the invention and is not intended to represent the only aspects of the invention. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1A:
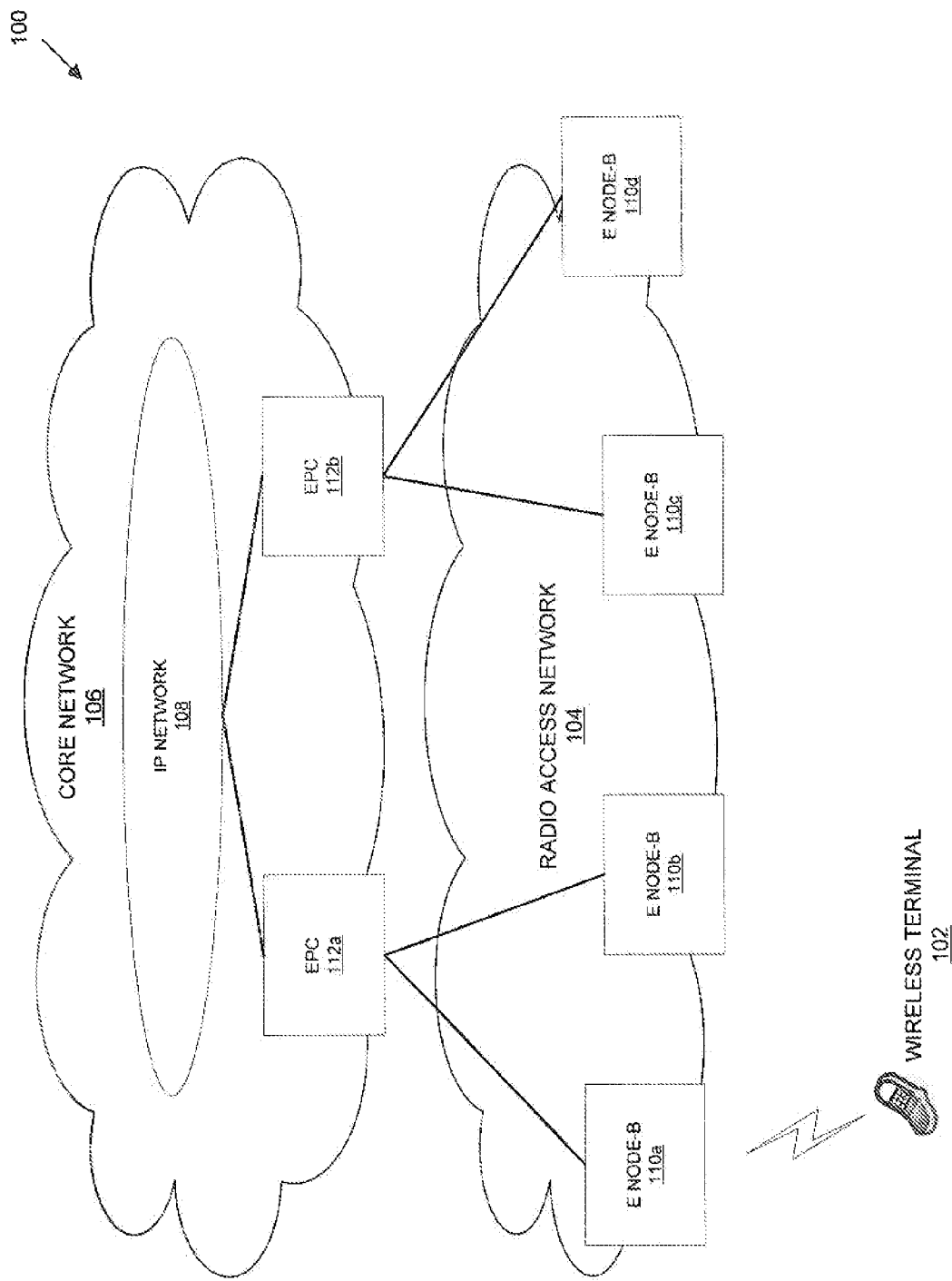
FIG. 1A is a conceptual diagram illustrating an example of a wireless terminal in a telecommunications system.

Various concepts presented throughout this disclosure may be utilized across a broad array of telecommunication systems, network architectures and communication protocols. One non-limiting example is shown in FIG. 1A with a wireless terminal 102 connected to a core network 106 through a RAN 104. In this example, the RAN 104 is an E-UTRAN and the core network 106 is an Internet Protocol (IP) network 108, however, other radio access technologies and core networks may be deployed. The wireless terminal 102 may be any suitable mobile device, including by way of example, a mobile or cellular telephone, a personal digital assistant (PDA), a portable television, a laptop computer, a digital camera, a digital camcorder, a game console, a portable audio device, a portable radio, or any other suitable device capable of supporting a radio link with a transceiver in the RAN 102.

The telecommunications system 100 shown in FIG. 1A includes a number of eNodes-B distributed throughout the RAN 104. For clarity of presentation, four eNode-Bs 110a-110d are shown, however, any number of eNode-Bs may be used to cover the geographic region of the telecommunications system 100. Each eNode-B 110a-110d serves the traditional role of a radio transceiver by providing an air interface and a RLC connection to the wireless terminals in its geographic region of coverage.

The RNC is traditional UTRAN architectures has been replaced by the EPC in the E-UTRAN architecture. In the example shown in FIG. 1A, two EPCs 112a, 112b are deployed, however, any number of EPCs may be used in actual implementation depending on the geographic reach of the RAN 104. The EPC resides in the core network 106, and as a result, a number of link layer functions traditionally performed by the RNC have been pushed down to the eNode-Bs 110a-110d in the RAN 104. These link layer functions include establishing, maintaining, reconfiguring and terminating the RRC connection with the wireless terminals. The EPC 112a, 112b may communicate through a direct physical connection as shown in FIG. 1, or alternatively, a virtual network connection through the IP network 108 or any other suitable transport network.

Figure 1B:
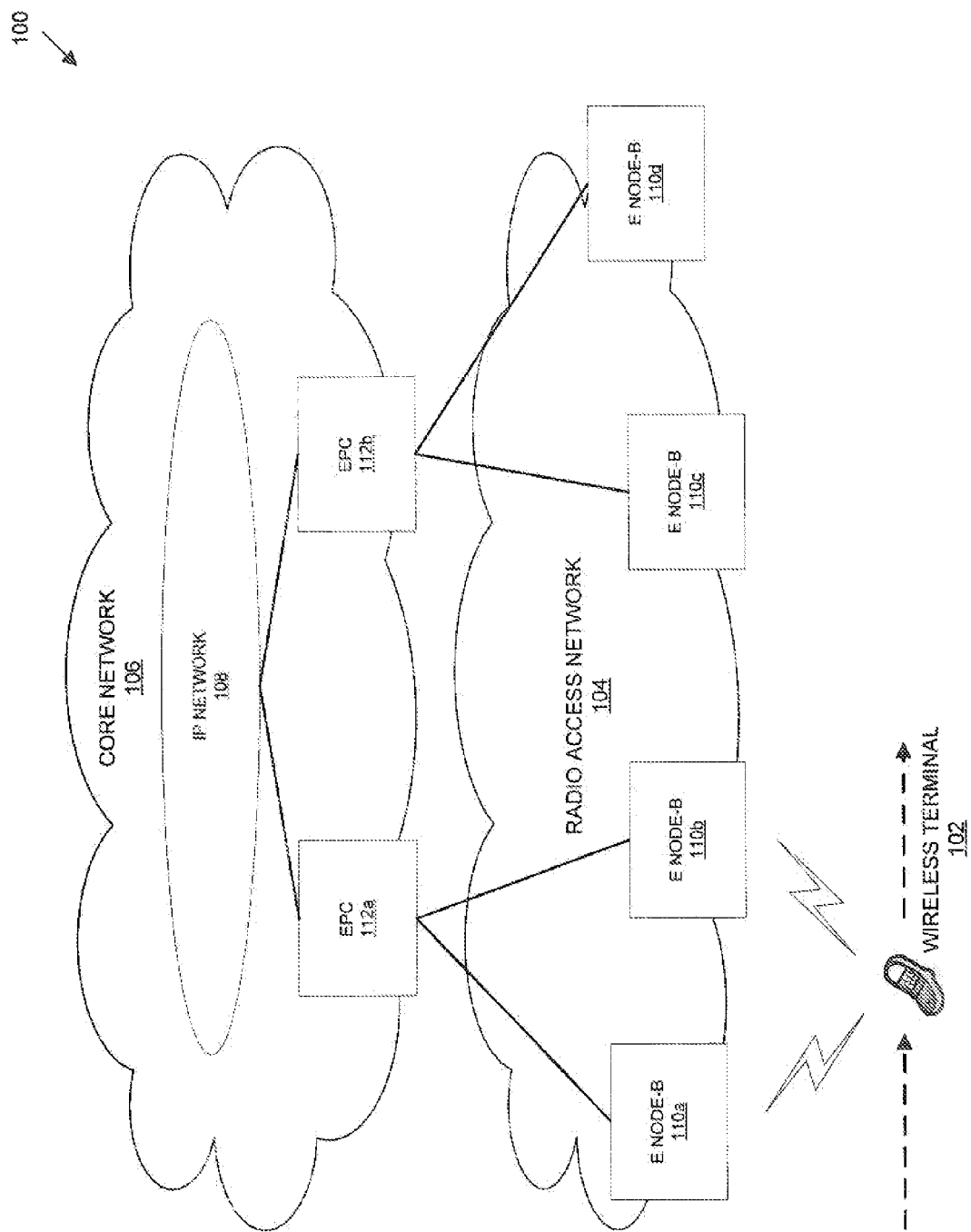
FIG. 1B is a conceptual diagram illustrating an example of a wireless terminal roaming in a telecommunications.

The wireless terminal 102 is shown in communication with an eNode-B 110a. This eNode-B 110a is referred to as a "serving" eNode-B because it serves as an access point to the RAN 104 for the wireless terminal 102. In FIG. 1B, the wireless terminal 102 is shown moving out of the coverage region of the serving eNode-B 110a by a series of broken lines. While in communication with the serving eNode-B 110a, the wireless terminal 102 may periodically search for signals from nearby eNode-Bs in order to detect any eNode-Bs that can provide better service than the serving eNode-B 110a. As the wireless terminal 102 continues along its path, the signal from nearby eNode-B 110b becomes sufficiently stronger than the signal from the serving eNode-B 110a to warrant a handover. In this example, the nearby eNode-B 110b becomes the "target" eNode-B because it is the target of the handover. As will be described in the following paragraphs, the handover from the serving eNode-B 110a to the target eNode-B 110b may be initiated by the RAN 104 or the wireless terminal 102 through a series of RRC messages. For clarity of presentation, only the most pertinent RRC messages to affect a handover will be described, however, those skilled in the art will readily understand that additional RRC messages may be required in actual implementations. In any event, once the handover is complete, the target eNode-B 110b becomes the serving eNode-B for the wireless terminal 102.

Figure 2:
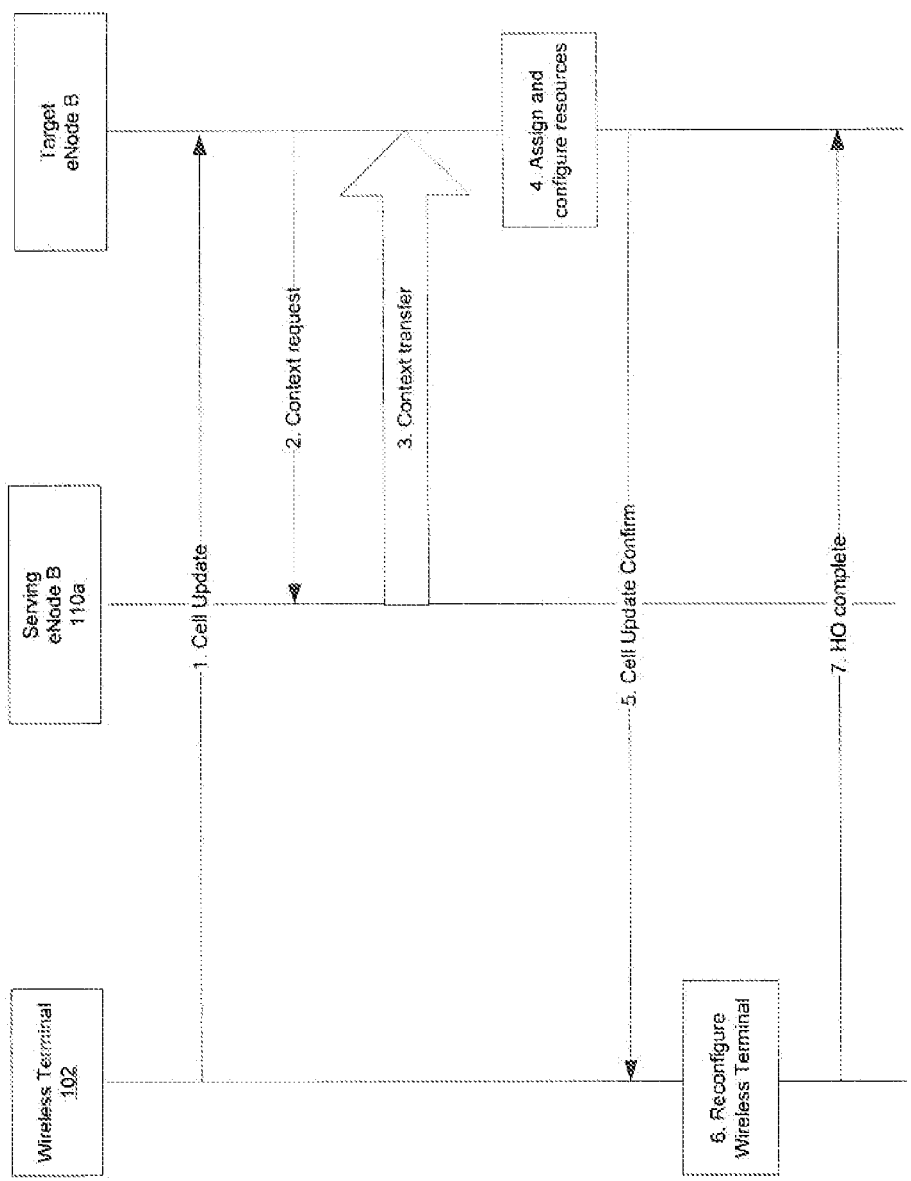
FIG. 2 is a diagram illustrating an example of the signaling for a handover procedure initiated by a wireless terminal.

FIG. 2 is a diagram illustrating an example of the RRC messages used in a handover procedure initiated by the wireless terminal. In this example, the wireless terminal 102 monitors the signals from all nearby eNode-Bs as it moves out of the coverage region of the serving eNode-B 110a. At some point, the wireless terminal 102 decides to initiate a handover by sending a cell update message (i.e., handover request) to the target eNode-B 110b (step 1). The cell update message contains the identification (ID) of the serving eNode-B. The target eNode-B 110b then sends a context request message to the serving eNode-B 110a to request a transfer of the RRC context (step 2). The RRC context may include pertinent information used for radio communications (e.g., the protocol state, the quality of service parameters, and so on). The RRC context is then transferred by the serving eNode-B 110a to the target eNode-B 110b (step 3). Once the RRC context is received, the target eNode-B 110b assigns and configures the radio resources necessary to support a new connection with the wireless terminal 102 (step 4). The target eNode-B 110b then sends a cell update confirm message to the wireless terminal 102 (step 5). Upon receiving the cell update confirm message, the wireless terminal 102 reconfigures itself for handover (e.g., tears down the protocol stacks for the serving eNode-B 110a and establishes the protocol stacks for the target eNode-B 110b) (step 6). After the wireless terminal 102 has reconfigured itself, it sends a handover complete message to the target eNode-B 110b to complete the handover procedure (step 7).

Figure 3:
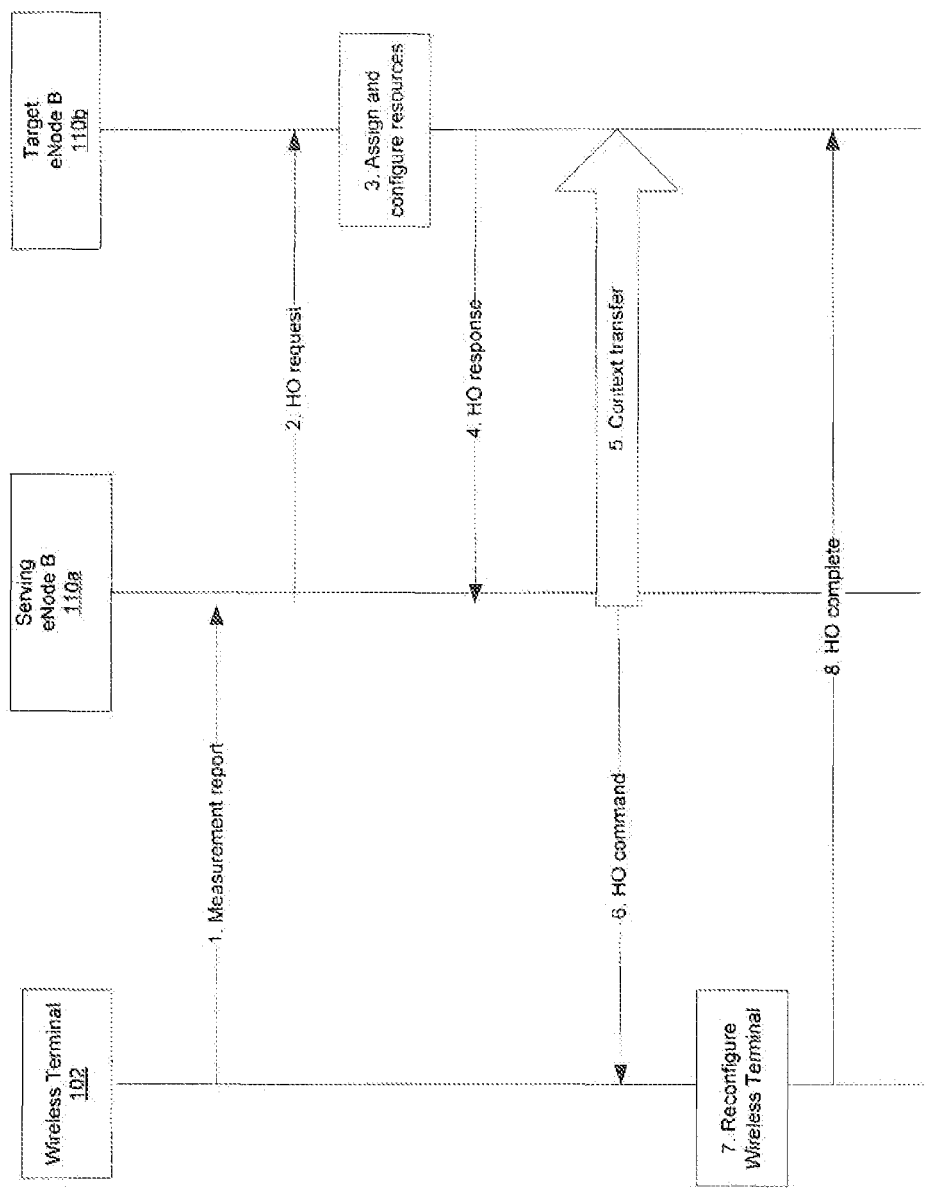
FIG. 3 is a diagram illustrating an example of the signaling for a handover procedure initiated by a radio access network.

FIG. 3 is a diagram illustrating an example of the RRC messages used in a handover procedure initiated by a RAN. In this example, the serving eNode-B 110a decides to handover the wireless terminal 102 to a target eNode-B 110b based on a measurement report received from the wireless terminal 102 (step 1). The serving eNode-B 110a initiates the handover by sending a handover request message to the target eNode-B 110b (step 2). In response to the handover request message, the target eNode-B 110b assigns and configures the radio resources necessary to support a new connection with the wireless terminal 102 (step 3). Once this occurs, the target eNode-B 110b send a handover response message to the serving eNode-B 110a indicating that it is ready to receive a handover of the wireless terminal 102 (step 4). In response to the handover response message, the serving e-Node-b 110a transfers the RRC context to the target eNode-B 110b (step 5). The serving eNode-B 110a also sends a hanover command to the wireless terminal 102 (step 6). Upon receiving the handover command, the wireless terminal 102 reconfigure itself for handover (step 7). After the wireless terminal 102 has reconfigured itself, it sends a handover complete message to the target eNode-B 110b to complete the handover procedure (step 8).

With the handover procedures just described, there is a possibility that the wireless terminal 102, or the target eNode-B 110b, may receive stale RRC message following the completion of the hanover. An example will now be presented with reference to FIG. 4. In this example, the serving eNode-B 110a decides to handover the wireless terminal 102 to a target eNode-B 110b based on a measurement report received from the wireless terminal 102 (step 1). Following an exchange of messages with the target eNode-B 110b, the serving eNode-B 110a initiates the handover by sending a handover command to the wireless terminal 102 (step 2). However, in this case, the wireless terminal 102 does not receive the handover command because, for example, the wireless terminal 102 has traveled too far outside the coverage region of the serving eNode-B 110a.

At some point, as the wireless terminal 102 travels further into the coverage region of the target eNode-B 110b, it initiates its own handover by sending a cell update message to the target eNode-B 110b (step 3). In response to the cell update message, the target eNode-B 110b sends a context requires message to the serving eNode-B 110a (step 4) and the serving e-Node-B 110a transfers the RRC context back to the target eNode-B 110b (step 5). Next, the target eNode-B 110b assigns and configures the radio resources necessary to support the new connection with the wireless terminal 102 (step 6) and then sends a cell update confirm message to the wireless terminal 102 (step 7). Upon receiving the cell update confirm message, the wireless terminal 102 reconfigures itself for handover (step 8). After the wireless terminal 102 has reconfigured itself, it sends a handover complete message to the target eNode-B 110b to complete the handover procedure (step 9).

Although the handover procedure is now complete, the RLC layer in the target eNode-B 110b, being an acknowledgement based retransmission protocol, resends the handover command to the wireless terminal 102 (step 10). The problem is that the RRC layer in the wireless terminal 102 does not know which eNode-B the handover command originated with. In this example, the handover command was originally sent from the serving eNode-B 110a, and therefore, it is a stale RRC message when later received by the wireless terminal 102 from the target eNode-B 110b (i.e., the new serving eNode-B) following handover.

Stale RRC messages that are received by either the wireless terminal 102 or the target eNode-B 110b following handover can be addressed with identifiers, such as sequence numbers or some other means of identification. In one example of a telecommunications system, each RRC message sent between the wireless terminal 102 and the serving eNode-B 110a can include a sequence number. In this example, the sequence numbers assigned to the uplink RRC messages are independent of the sequence numbers assigned to the downlink RRC messages. The wireless terminal 102, in an uplink RRC message to the target eNode-B 110b, includes the highest sequence number for the RRC message sent by the wireless terminal 102 to the serving eNode-B 110a. Similarly, the target eNode-B 110b, in a downlink RRC message, includes the highest sequence number for the RRC messages sent by the serving eNode-B 110b to the wireless terminal 102. After the handover is completed, the wireless terminal 102 and the target eNode-B 110b can use the sequence numbers to identify stale RRC messages. An example will now be provided with reference to FIG. 5.

Figure 4:
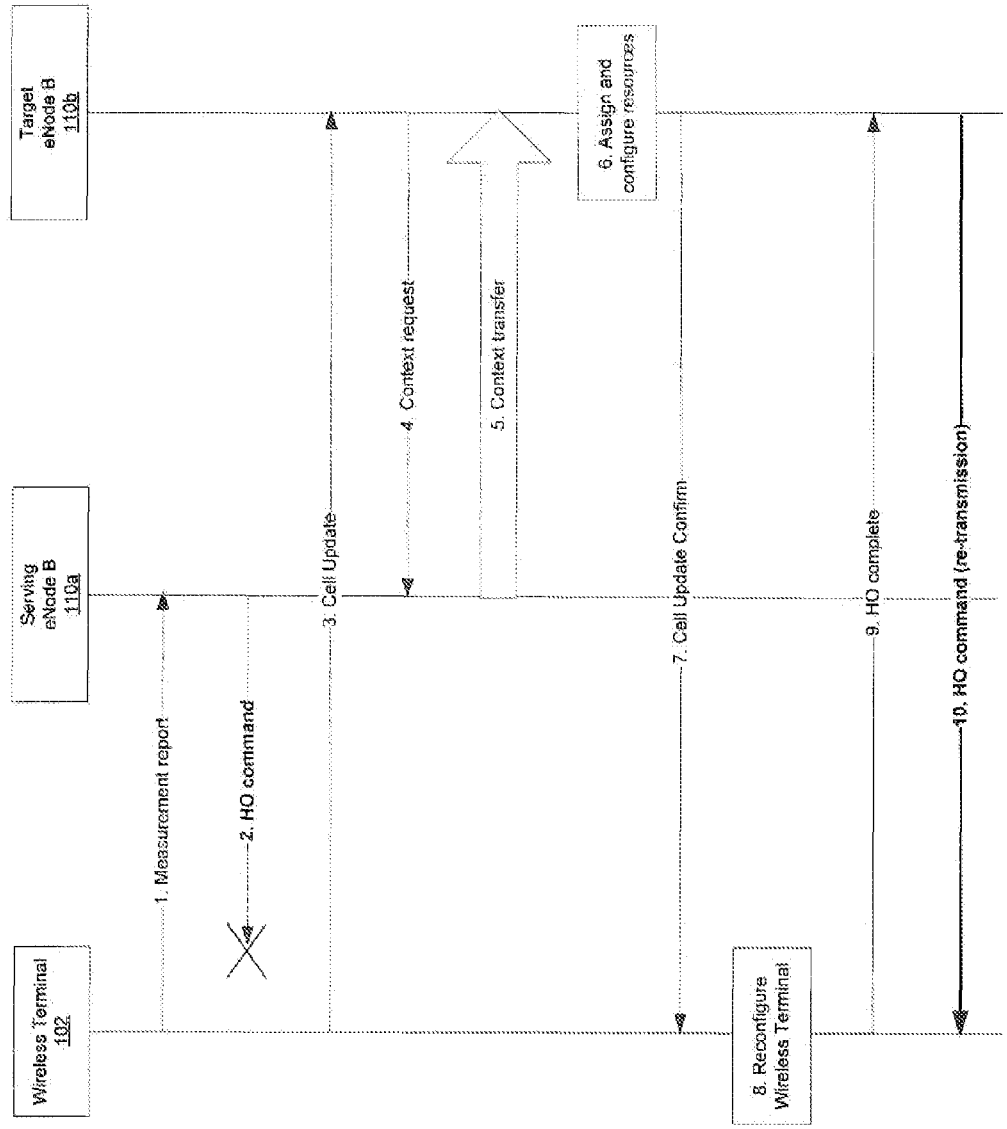
FIG. 4 is a diagram illustrating an example of the signaling in a handover procedure in which the wireless terminal receives stale messages.
Figure 5:
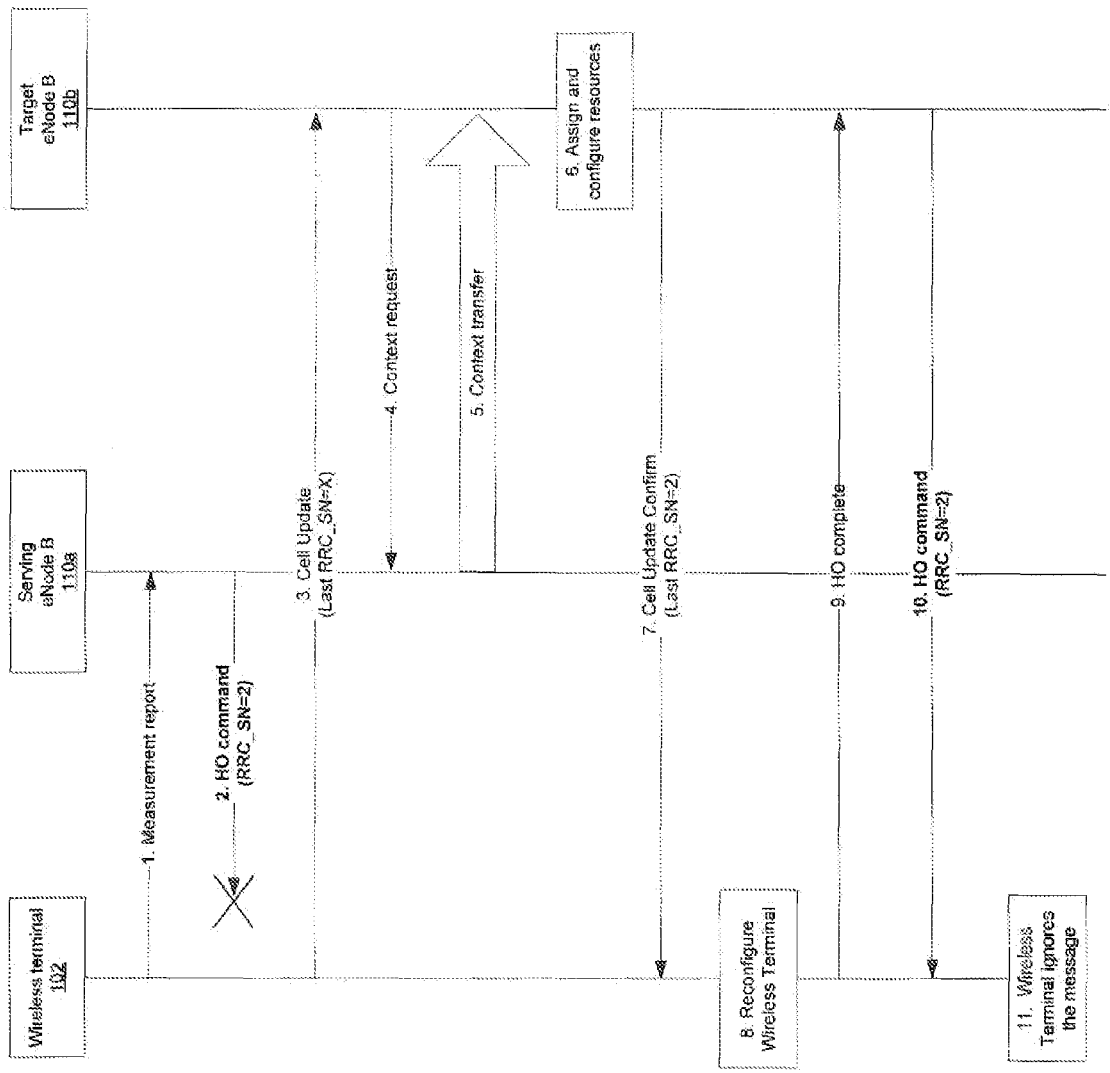
FIG. 5 is a diagram illustrating an example of the signaling in a handover procedure to recognize stale messages.

Referring to FIG. 5, the serving eNode-B 110a decides to handover the wireless terminal 102 to the target eNode-B 110b based on the measurement report received from the wireless terminal 102 (step 1). The serving eNode-B 110a initiates the handover by sending a handover command to the wireless terminal 102 (step 2). The handover command includes the sequence number "2" indicating that the handover command is the second downlink RRC message in the handover procedure. Similarly to the situation described earlier in connection with FIG. 4, the wireless terminal 102 does not receive the handover command because, for example, it has traveled too far out of the coverage region of the serving eNode-B 110a.

At some point, as the wireless terminal 102 travels further into the coverage region of the target eNode-B 110b, it initiates its own handover by sending a cell update message to the target eNode-B 110b (step 3). The cell update message includes the highest sequence number for the uplink RRC messages sent from the wireless terminal 102 to the serving e-Node B 110a. In response to the cell update message, the target eNode-B 110b sends a context request message to the serving eNode-B 110a (step 4) and the serving eNode-B 110a transfers the RRC context back to the target eNode-B 110b (step 5). In this example, the RRC context includes the sequence number "2" (the highest sequence number for the downlink RRC message sent from the serving eNode-B 110a to the wireless terminal 102). Once the RRC context is transferred, the target eNode-B 110b assigns and configures the radio resources necessary to support the connection with the wireless terminal 102 (step 6) and then sends a cell update confirm message to the wireless terminal 102 (step 7). The cell update confirm message include the highest sequence number for the downlink RRC messages sent by the serving eNode-B 110a. Upon receiving the cell update confirm message, the wireless terminal 102 reconfigures itself from handover (step 8). After the wireless terminal 102 has reconfigure itself, it sends a handover complete message to the target eNode-B 110b to complete the handover procedure (step 9).

Once the handover is complete, the RLC layer in the target eNode-B 110b then resends the handover command to the wireless terminal 102 with the sequence number "2" (step 10). Based on the cell update confirm message received from the target eNode-B 110b, the wireless terminal 102 recognizes that all downlink RRC message with a sequence number (SN) of "2" or less are stale. The stale RRC message can be ignored (step 11) as shown in FIG. 4, or handled in some other manner. Ignoring the stale RRC message is an attractive approach, at least in the downlink direction, because the new serving eNode-B 110b has already configured the wireless terminal 102 with the cell update confirm message.

This handover procedure is very effective in dealing with sate RRC messages, but still results in the retransmission of stale messages. The retransmission of stale messages occurs because the RLC is not aware of which messages can be ignored at the RRC layer. By involving the RLC in the handover procedure, the retransmission of stale messages may be avoided. An example will now be provided with reference to FIG. 6.

Figure 6:
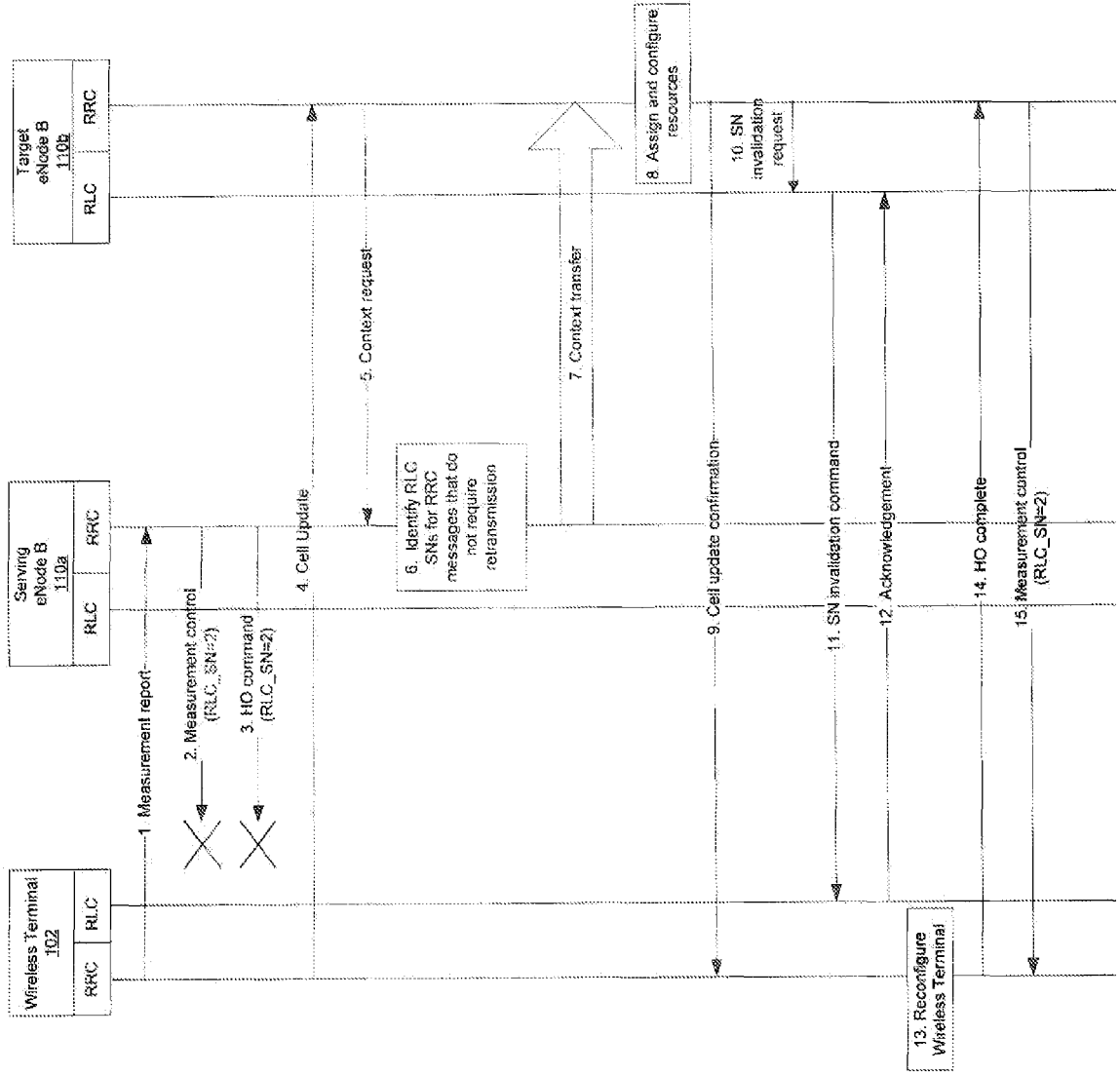
FIG. 6 is a diagram illustrating an example of the signaling in a handover procedure to avoid retransmission of stale messages.

Referring to FIG. 6, the serving eNode-B 110a decides to handover the wireless terminal 102 to the target eNode-B 110b based on a measurement report received from the wireless terminal 102 (step 1). The serving eNode-B 110a initiates the handover by sending a series of RRC messages, including a measurement control message (step 2) and a handover command (step 3), to the wireless terminal 102. These messages are generated by the RRC layer and assigned sequence numbers at the RLC layer. In this example, the measurement control message is assigned sequence number "2" and the handover command is assigned sequence number "3." These RRC messages, however, are never received by the wireless terminal 102 because, for example, the wireless terminal 102 has traveled too far out of the coverage region of the serving eNode-B 110a.

At some point, as the wireless terminal 102 travels further into the coverage region of the target eNode-B 110b, it initiates its own handover by sending a cell update message to the target eNode-B 110b (step 4). The target eNode-B 110b then sends a context request message to the serving eNode-B 110a (step 5). In response to the context request message, the serving eNode-B 110a identifies the sequence numbers for the RRC messages that do not require retransmission after the handover of wireless terminal 102 is completed (step 6). In this example, the serving eNode-B 110a identifies sequence number "3" because the handover command does not require retransmission following handover. The serving eNode-B 110a then transfers the RRC context to the target eNode-B 110b (step 7). Included in the transfer is a list of sequence numbers for RRC messages that do not require retransmission (i.e., sequence number "3").

Once the RRC context is transferred, the target eNode-B 110b assigns and configures the radio resources necessary to support the connection with the wireless terminal 102 (step 8) and then sends a cell update confirm message to the wireless terminal 102 (step 9). Next, or at the same time, the RRC layer in the target eNode-B 110b provides a sequence number invalidation request (step 10) containing the list of sequence numbers included in the RRC context transfer from the serving eNode-B 110b. A sequence number invalidation command is generated at the RLC layer for each sequence number in the list and sent to the RLC layer in the wireless terminal 102 (step 11). In this example, a sequence number invalidation command for sequence number "3" is sent from the target eNode-B 110b to the wireless terminal 102. In response to the sequence number invalidation command, the wireless terminal 102 sends a RLC acknowledgement (ACK), or other RLC message, back to the target eNode-B 110b (step 12). The ACK, or other RLC message, is treated by the target eNode-B 110b as an indication that the corresponding RRC message (i.e., the handover command) has been successfully received by the wireless terminal 102. As a result, the target eNode-B 110b does not retransmit the handover command.

Next, the wireless terminal 102 reconfigures itself for handover (step 13). After the wireless terminal 102 has reconfigured itself, it sends a handover complete message to the target eNode-B 110b to complete the handover procedure (step 14). Once the handover is complete, the target eNode-B 110b resends the RRC messages that have not been acknowledged by the wireless terminal 102. In this example, only the measurement control message will be retransmitted (step 15).

Figure 7:
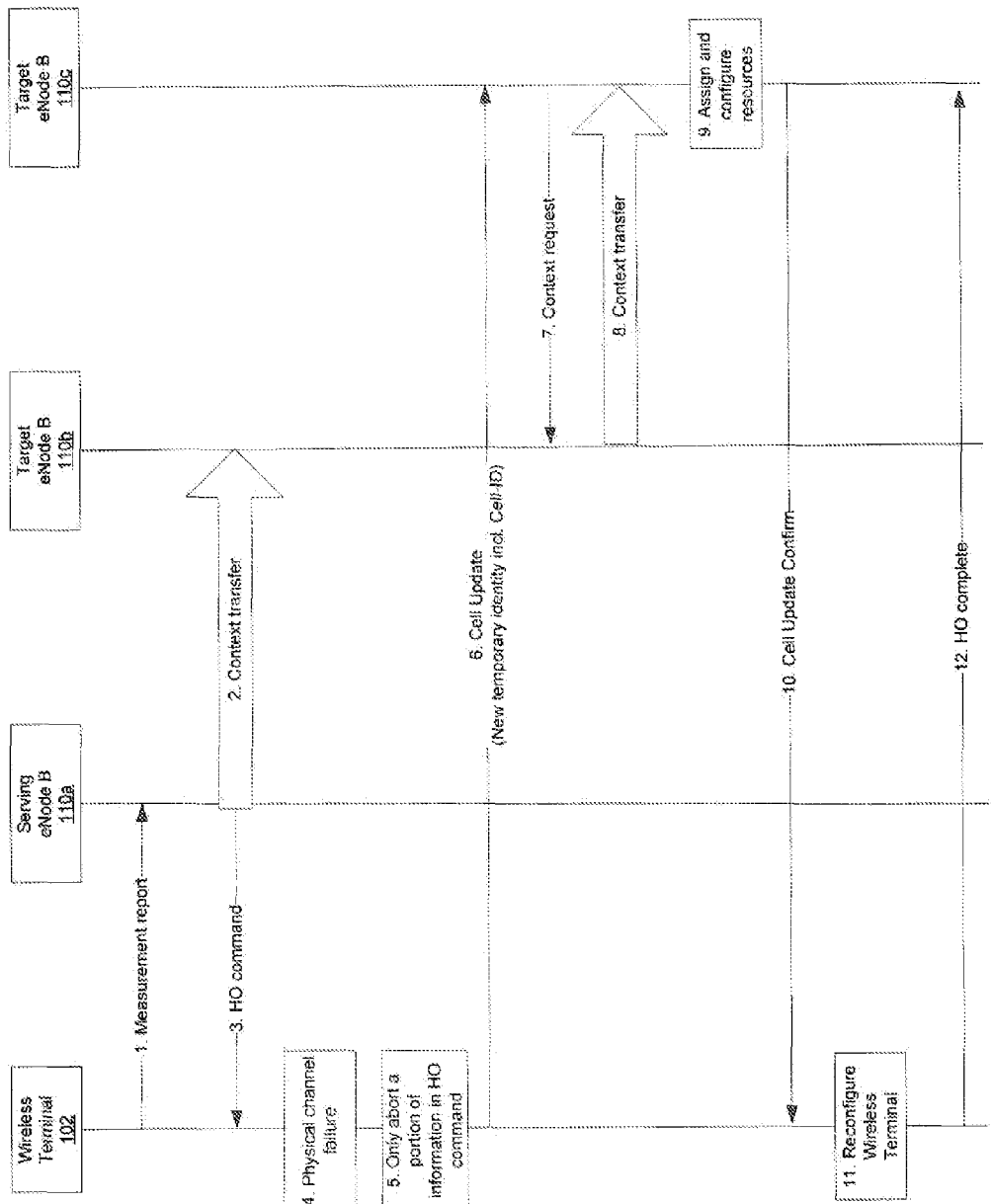
FIG. 7 is a diagram illustrating an example of the signaling for a handover procedure following a failed attempt.

The various handover procedures described thus far should be capable of recovering from a failed handover attempt, even after a reconfiguration RRC message is received by the wireless terminal 102. An example will now be presented with reference to FIG. 7. Referring to FIG. 7, the serving eNode-B 110a decides to handover the wireless terminal 102 to a target eNode-B 110b based on a measurement report received from the wireless terminal 102 (step 1). The serving eNode-B 110a and the target eNode-B 110b then exchange RRC messages to allocate radio resources at the target eNode-B 110b to support the handover. The exchange of RRC message also results in the RRC context being transferred from the serving eNode-B 110a to the target eNode-B 110b (step 2). As part of this transfer, the RLC context is also transferred. At the same time, or thereabouts, a handover command is sent from the serving eNode-B 110a to the wireless terminal 102 (step 3). The handover command includes a temporary ID for the wireless terminal 102 in the target eNode-B 110b as well as information required by the wireless terminal 102 to reconfigure itself for the handover (e.g., tear down the protocol stacks with the serving eNode-B 110a and establish new protocol stacks for the target eNode-B 110b). Should the wireless terminal 102 experience a subsequent failure (e.g., a physical channel failure) (step 4), then the wireless terminal 102 only aborts the portion of the handover command (step 5). More specifically, the wireless terminal 102 only aborts the reconfiguration information relating to the physical layer. The temporary ID and all other information for reconfiguring the protocol stack above the physical layer are maintained by the wireless terminal 102.

When the physical channel is restored, the wireless terminal 102 locates a new target eNode-B 110*c* and sends a cell update message to that eNode-B 110*c* (step 6). The cell update message includes the temporary ID for the wireless terminal 102 in the original target eNode-B 110*b*. The new target eNode-B 110*c* uses the temporary ID in the cell update message to request the RRC and RLC context for the wireless terminal 102 from the original target eNode-B 110*b* (step 7). In response to this request, the original target eNode-B 110*b* transfers the RRC and RLC context to the new target eNode-B 110*c* assigns and configures the radio resources necessary to support the connection with the wireless terminal 102 (step 9). The new target eNode-B 110*b* then sends a cell update confirm message to the wireless terminal 102 (step 10). Upon receiving the cell update confirm message, the wireless terminal 102 reconfigures itself for handover using the information retained from the handover command (e.g., tears down the protocol stacks for the serving eNode-B 110*a* and establishes the protocol stacks for the target eNode-B 110*b*) (step 11). After the wireless terminal 102 has reconfigured itself, it sends a handover complete message to the new target eNode-B 110*b* to complete the handover procedure (step 12).

Figure 8:
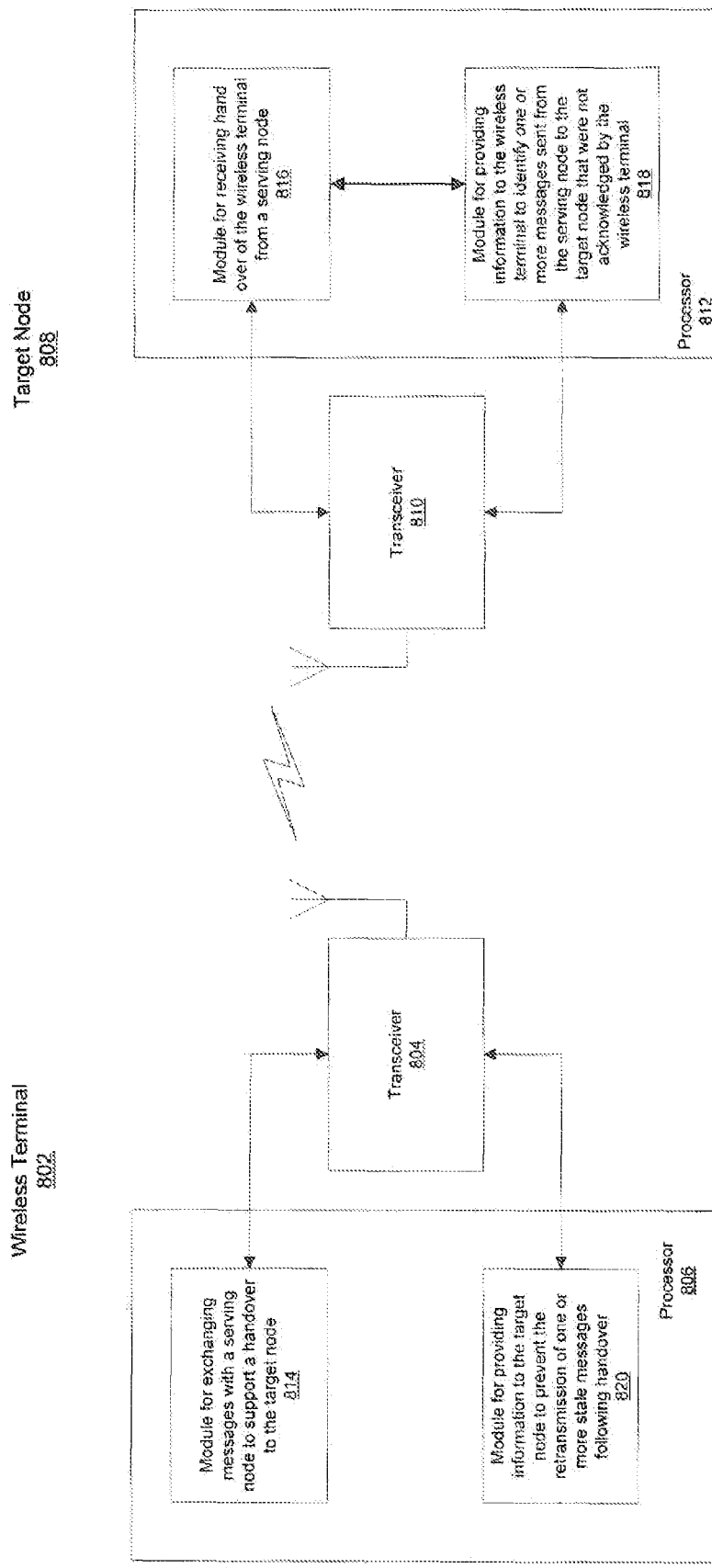
FIG. 8 is a functional block diagram illustrating an example of a wireless terminal and a target node in a radio access network.

FIG. 8 is functional block diagram illustrating an example of a wireless terminal being handed over to a target node. The wireless terminal 802 includes a transceiver 804 and a processor 806. The target node 808 also includes a transceiver 810 and a processor 812. In the E-UTRAN example described earlier, the transceivers 804, 810 provide a W-CDMA air interface with the RAN, but may support other air interfaces in alternative configurations. The processors 806, 812 are shown in block diagrams to illustrate their functionality. These functional blocks may be implemented in hardware, software, firmware, middleware, microcode, hardware description languages, or any combination thereof. By way of example, one or both functional blocks may be implemented with code running on a microprocessor, a digital signal processor (DSP), or any other suitable platform. Code may represent a procedure, a function, a subprogram, a program, a routine, a subroutine, a module, or any combination of instructions, data structures, or program statements. The code may reside in computer readable media. The computer readable media may include one or more storage devices, including by way of example, RAN memory, flash memory, ROM memory, EPROM memory, EEPROM memory, registers, hard disk, a removable disk, a CD-ROM, or any other form of storage media known in the art. Computer readable media may also include a carrier wave that encodes a data signal. Alternatively, or in addition to, one or both functional blocks may be implemented with an application specific integrated circuit (ASIC), a controller, microcontroller, a state machine, a filed programmable gate array (FPGA) or other programmable logic component, discrete gate or transistor logic, discrete hardware components, or any combination thereof. Those skilled in the art will recognize the interchangeability of hardware, firmware, and software configurations under these circumstances, and how best to implement the described functionality for each particular application.

Referring to FIG. 8, the processor 806 in the wireless terminal 802 includes a module 814 for exchanging message with a serving node to support a handover to the target node 808. The processor 812 in the target node 808 includes a module 816 for receiving a handover of the wireless terminal 802 and a module 818 for providing information to the wireless terminal 802 to identify one or more message sent from the serving node to the target node 808 that were not acknowledged by the wireless terminal 802. The processor 806 in the wireless terminal 802 also includes a module 820 for providing information to the target node 808 to prevent the retransmission of one or more stale messages following handover.

Figure 9:
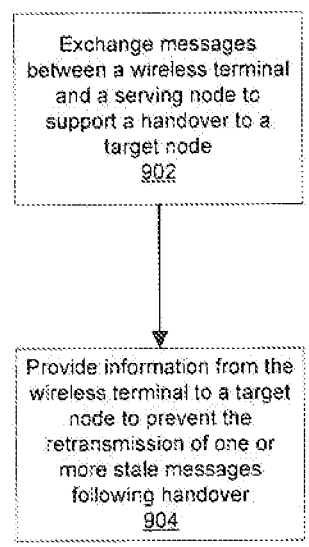
FIG. 9 is a flow chart illustrating an example of a method of hand over in a radio access network.

FIG. 9 is a flow chart illustrating an example of a method of hand over in a radio access network. In step 902, messages are exchanged between a wireless terminal and a serving node to support a handover to a target node. In step 904, the wireless terminal provides information to the target node to prevent the retransmission of one or more stale message following handover. In one configuration of a wireless terminal with an acknowledgement based protocol, the information may be an acknowledgement for each of the one or more stale message that would otherwise be retransmitted by the target node to the wireless terminal. In this configuration, the information provided to the target node from the wireless terminal may be generated from information received by the wireless terminal from the target node. By way of example, each message sent between the wireless terminal and the serving node may include a sequence number, and the information received by the wireless terminal from the target node may include the sequence number for each of the one or more messages sent by the serving node to the wireless terminal that were not acknowledged. The information provided by the wireless terminal to the target node may be an acknowledgement for each of the one or more message having one of the sequence numbers received by the wireless terminal. This handover procedure is well suited for a wireless terminal having a protocol stack with the acknowledgement based protocol layer residing below the layer responsible for exchanging hand over messages with the serving and target nodes.

Figure 10:
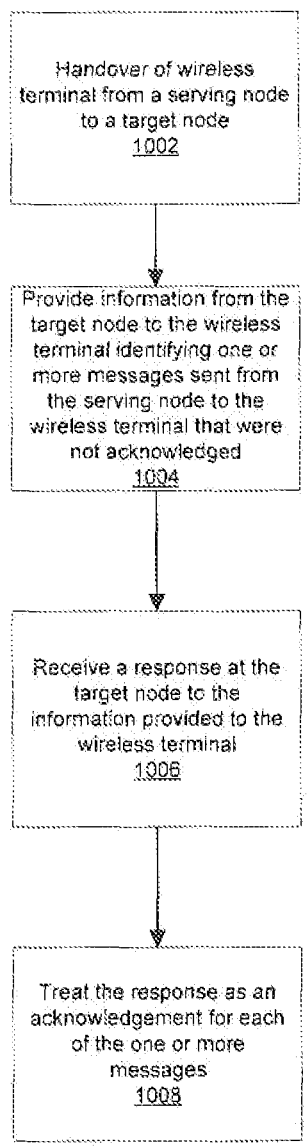
FIG. 10 is a flow chart illustrating another aspect of a method of hand over in a radio access network.

FIG. 10 is a flow chart illustrating another example of a method of hand over in a radio access network. In step 1002, a wireless terminal having an acknowledgement based protocol is handed over from a serving node to a target node. In step 1004, the target node provides information to the wireless terminal identifying one or more messages sent from the serving node to the wireless terminal that were not acknowledged. The information provided to the wireless terminal may be received by the target node from the serving node. Each of the one or more messages may include a sequence number, and in that case, the information provided to the wireless terminal may include the sequence number for each of the one or more messages. In one configuration of the target node, the target node, in step 1006, receives a response to the information provided to the wireless terminal 1006, and, in step 1008, the target node treats the response as an acknowledgement for each of the one or more messages. This handover procedure is well suited for a wireless terminal having a protocol stack with the acknowledgement based protocol layer residing below the layer responsible for exchanging hand over messages with the serving and target nodes.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein buy reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A wireless terminal, comprising:
   a memory unit; and
   at least one processor coupled to the memory unit, the at least one processor being configured:
   to exchange uplink messages and downlink messages with a serving node to support a handover to a target node in a radio access network, sequence numbers assigned to the uplink messages being independent of sequence numbers assigned to the downlink messages,
   to receive, from the target node, a sequence number for at least one unacknowledged downlink message transmitted by the serving node, and
   to provide information to the target node to prevent the retransmission of one or more stale messages following the handover.

2. The wireless terminal of claim 1 wherein the information comprises an acknowledgement for each of the one or more stale messages that would otherwise be retransmitted by the target node to the wireless terminal.

3. The wireless terminal of claim 1 wherein the processor is further configured to use the received information to generate the information provided to the target node.

4. The wireless terminal of claim 1 wherein the information provided to the target node comprises an acknowledgement for each message that was received by the processor.

5. The wireless terminal of claim 1 wherein the uplink messages and downlink messages are second layer messages, and the information provided to the target node is first layer information, the first layer being an acknowledgement based protocol layer that resides below the second layer.

6. The wireless terminal of claim 5 wherein the first layer is a RLC protocol layer and the second layer is a RRC protocol layer.

7. The wireless terminal of claim 5 wherein each second layer message includes a sequence number, and wherein the processor is further configured:
   to receive the sequence number for each unacknowledged message sent by the serving node, and
   to provide a first layer acknowledgement to the target node for each message having a sequence number received by the processor.

8. A node, comprising:
   a memory unit; and
   at least one processor coupled to the memory unit, the at least one processor being configured:
   to receive a handover of a wireless terminal from a serving node, the wireless terminal having an acknowledgement based protocol, and
   to provide information, from a target node to the wireless terminal, identifying a sequence number of an unacknowledged message sent from the serving node to the wireless terminal, and
   to receive, in response to the provided information, an acknowledgement for the unacknowledged message, a sequence number assigned to a message sent from the serving node being independent of sequence numbers assigned to uplink messages.

9. The node of claim 8 wherein the processor is further configured to request, from the serving node, the information provided to the wireless terminal.

10. The node of claim 8 wherein the processor is further configured:
    to transmit a second layer request to the serving node for the information provided from the serving node to the wireless terminal, the information identifying the sequence number being first layer information, first layer comprising the acknowledgement based protocol and a second layer being above the first layer.

11. A wireless terminal, comprising:
    means for exchanging uplink messages and downlink messages with a serving node to support a handover to a target node in a radio access network, sequence numbers assigned to the uplink messages being independent of sequence numbers assigned to the downlink messages;
    means for receiving, from the target node, a sequence number for at least one unacknowledged downlink message transmitted by the serving node, and
    means for providing information to the target node to prevent the retransmission of one or more stale messages following the handover.

12. The wireless terminal of claim 11 wherein the information comprises an acknowledgement for each of the one or more stale messages.

13. The wireless terminal of claim 11 further comprising means for using the received information to generate the information provided to the target node.

14. The wireless terminal of claim 11 wherein the information provided to the target node comprises an acknowledgement for each message received by the wireless terminal.

15. The wireless terminal of claim 11 wherein the uplink messages and downlink messages are second layer messages, and the information provided to the target node is first layer information, the first layer being an acknowledgement based protocol layer that resides below the second layer.

16. The wireless terminal of claim 15 wherein the first layer is a RLC protocol layer and the second layer is a RRC protocol layer.

17. The wireless terminal of claim 15 wherein each second layer message includes a sequence number, the wireless terminal further comprising means for receiving a first layer message comprising the sequence number for each unacknowledged message sent by the serving node, means for providing a first layer acknowledgement to the target node for each message having a sequence number received by the wireless terminal.

18. A node, comprising:
    means for receiving a handover of a wireless terminal from a serving node, the wireless terminal having an acknowledgement based protocol;
    means for providing information, from a target node to the wireless terminal, identifying a sequence number of an unacknowledged message sent from the serving node to the wireless terminal; and
    means for receiving, in response to the provided information an acknowledgement for the unacknowledged message, a sequence number assigned to a message sent from the serving node being independent of sequence numbers assigned to uplink messages.

19. The node of claim 18 further comprising means for requesting, from the serving node, the information provided to the wireless terminal.

20. The node of claim 18 further comprising means for transmitting a second layer request to the serving node for the information provided from the serving node to the wireless terminal, the information identifying the sequence number being first layer information, the first layer comprising the acknowledgement based protocol and a second layer being above the first layer.

21. A method of handover in radio access network, comprising:
   exchanging uplink messages and downlink messages with a serving node to support a handover to a target node in a radio access network, sequence numbers assigned to the uplink messages being independent of sequence numbers assigned to the downlink messages;
   receiving, from the target node, a sequence number for at least one unacknowledged downlink message transmitted by the serving node, and
   providing information to the target node to prevent the retransmission of one or more stale messages following the handover.

22. The method of claim 21 wherein the information comprises an acknowledgement for each of the one or more stale messages that would otherwise be retransmitted by the target node to the wireless terminal.

23. The method of claim 21 further comprising using the received information to generate the information provided to the target node.

24. The method of claim 21 wherein the information provided to the target node comprises an acknowledgement for each message having a sequence number received by the wireless terminal.

25. The method of claim 21 wherein the messages exchanged with the serving node are second layer messages, and the information provided to the target node is first layer information, the first layer being an acknowledgement based protocol layer that resides below the second layer.

26. The method of claim 25 wherein the first layer is a RLC protocol layer and the second layer is a RRC protocol layer.

27. The method of claim 25 wherein each second layer message includes a sequence number, the method further comprising receiving a first layer message comprising the sequence number for each unacknowledged message sent by the serving node, the information being provided from the wireless terminal to the target node as a first layer acknowledgement for each message having a sequence number received by the wireless terminal.

28. A method of handover in radio access network, comprising:
   handing over a wireless terminal from a serving node to a target node, the wireless terminal having an acknowledgement based protocol;
   providing information, from the target node to the wireless terminal, identifying a sequence number of an unacknowledged message sent from the serving node to the wireless terminal;
   receiving, at the target node, in response to the provided information, an acknowledgement for the unacknowledged message, a sequence number assigned to a message sent from the serving node being independent of sequence numbers assigned to uplink messages.

29. The method of claim 28 further comprising sending a request, from the target node to the serving node, for the information provided to the wireless terminal.

30. The method of claim 28 further transmitting a second layer request to the serving node for the information provided from the serving node to the wireless terminal, the information identifying the sequence number being first layer information, the first layer comprising the acknowledgement based protocol and a second layer being above the first layer.

31. A non-transitory computer-readable medium for use in a wireless terminal, the computer-readable medium including instructions stored thereon, the instructions including:
   code to exchange uplink messages and downlink messages with a serving node to support a handover to a target node in a radio access network, sequence numbers assigned to the uplink messages being independent of sequence numbers assigned to the downlink messages;
   code to receive, from the target node, a sequence number for at least one unacknowledged downlink message transmitted by the serving node, and
   code to provide information to the target node to prevent the retransmission of one or more stale messages following the handover.

32. The non-transitory computer-readable medium of claim 31 wherein the information comprises an acknowledgement for each of the one or more stale messages that would otherwise be retransmitted by the target node to the wireless terminal.

33. The non-transitory computer-readable medium of claim 31 wherein the instructions further comprise code for using the received information to generate the information provided to the target node.

34. The non-transitory computer-readable medium of claim 31 wherein the information provided to the target node comprises an acknowledgement for each message having a sequence number received by the wireless terminal.

35. The non-transitory computer-readable medium of claim 31 wherein the messages exchanged with the serving node are second layer messages, and the information provided to the target node is first layer information, the first layer being an acknowledgement based protocol layer that resides below the second layer.

36. The non-transitory computer-readable medium of claim 35 wherein the first layer is a RLC protocol layer and the second layer is a RRC protocol layer.

37. The non-transitory computer-readable medium of claim 35 wherein each second layer message includes a sequence number, the instructions further comprising code to receive a first layer message comprising the sequence number for each unacknowledged message sent by the serving node, wherein the code to provide information to the target node further comprises code to provide a first layer acknowledgement for each message having a sequence number received by the wireless terminal.

38. A non-transitory computer-readable medium for use in a node, the computer-readable medium including instructions stored thereon, the instruction including:
   code to support a handover of a wireless terminal from a serving node, the wireless terminal having an acknowledgement based protocol;
   code to provide information, from a target node to the wireless terminal, identifying a sequence number of an unacknowledged message sent from the serving node to the wireless terminal; and
   code to receive, in response to the provided information, an acknowledgement for the unacknowledged message, a sequence number assigned to a message sent from the serving node being independent of sequence numbers assigned to uplink messages.

39. The non-transitory computer-readable medium of claim 38 wherein the instructions further comprise code to request, from the serving node, the information provided to the wireless terminal.

40. The non-transitory computer-readable medium of claim 38 wherein the instructions further comprise code to transmit a second layer request to the serving node for the information provided from the serving node to the wireless terminal, the information identifying the sequence number being first layer information, the first layer comprising the acknowledgement based protocol and a second layer being above the first layer.

* * * * *